United States Patent [19]

Kassai

[11] 4,346,908
[45] Aug. 31, 1982

[54] VEHICLE FOR CHILDREN

[75] Inventor: Kenzou Kassai, Higashishimizu, Japan

[73] Assignee: Kassai Kabushiki Kaisha, Osaka, Japan

[21] Appl. No.: 154,239

[22] Filed: May 29, 1980

[30] Foreign Application Priority Data

Jun. 1, 1979 [JP] Japan .............................. 54-74876[U]

[51] Int. Cl.³ .............................................. B62M 1/00
[52] U.S. Cl. .................................. 280/87.02 R; 46/17; 280/1.11 R
[58] Field of Search .................... 280/87.02 R, 1.11 R, 280/87.01, 1.13; D21/78; 46/16, 17, 24

[56] References Cited

U.S. PATENT DOCUMENTS 3,224,137 12/1965 Wright ................................ 46/17 X
3,410,021 11/1968 Patterson ............................ 46/16 X
4,095,816 6/1978 Langieri ....................... 280/87.02 R

FOREIGN PATENT DOCUMENTS 52-99899 7/1977 Japan .
53-85270 7/1978 Japan .
2026328 2/1980 United Kingdom .

Primary Examiner—Joseph F. Peters, Jr.
Assistant Examiner—Donn McGiehan
Attorney, Agent, or Firm—Browdy and Neimark

[57] ABSTRACT

A play vehicle for children provided with a base at a suitable position on the vehicle whereon bosses for block building are arranged. The base is preferably detachably provided at a suitable position on the vehicle for children. The vehicle for children is preferably a vehicle which a child can straddle and go forward by kicking the ground, the vehicle comprising a body, a hinged seat attached to the body, respective pairs of front and rear wheels provided at the front and rear portions of the body respectively and a handle provided at the front portion of the body. The base is preferably provided on the hood of the vehicle. There is preferably a container under the seat of the vehicle which contains unit blocks for block building.

3 Claims, 3 Drawing Figures

VEHICLE FOR CHILDREN

FIELD OF THE INVENTION

The present invention relates to a vehicle for children with which a child can play block building.

BACKGROUND OF THE INVENTION

Conventionally, there are several types of vehicles for children, for example, a special type vehicle for children which a child can straddle and go forward by kicking the ground, an automobile for children which a child can ride on and go forward by treading pedals which drive front or rear wheels, and a tricycle for children. There have been several attempts to make those vehicles more interesting for children, for example, by representing a crying or laughing face of a human being on the hood of the vehicle.

On the other hand, conventionally there is a block building toy which is similar to the usual building block toy. The block building toy is a toy wherein a child enjoys constructing his desired shape, for example, an airplane, a tank, or an animal by combining a number of unit blocks.

SUMMARY OF THE INVENTION

It is an object of the present invention to provide a new vehicle for children by which a child can not only play with the vehicle itself but can also play at block building by, providing a base at a suitable position on the vehicle.

It is a further object of the present invention to provide a vehicle for children by the use of which a child can play block building apart from the vehicle itself by removing from the vehicle the base and unit blocks for block building.

BRIEF DESCRIPTION OF THE DRAWINGS

In order that the invention may be more readily understood, one particular embodiment will now be described with reference to the accompanying drawings wherein.

DESCRIPTION OF PREFERRED EMBODIMENTS

Figure 1:
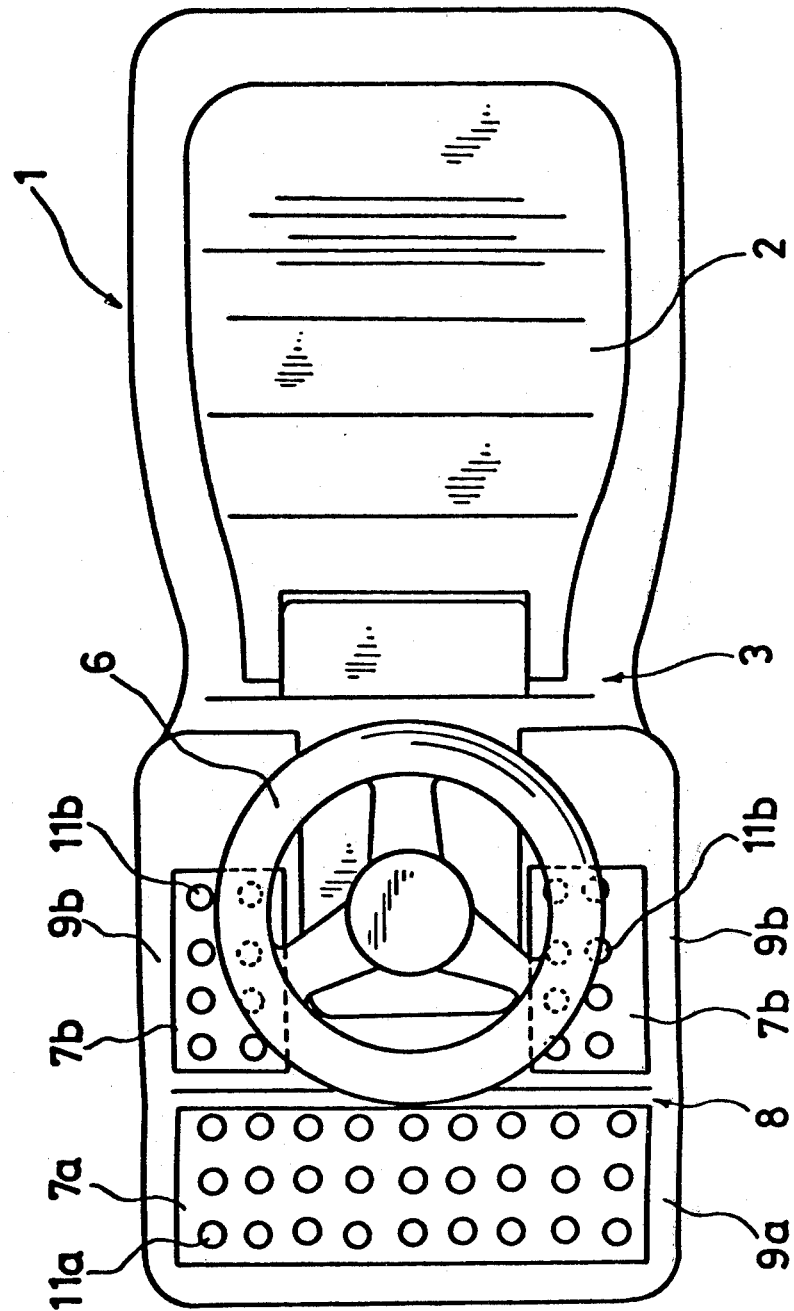
FIG. 1 is a top view of an embodiment of the present invention.
Figure 2:
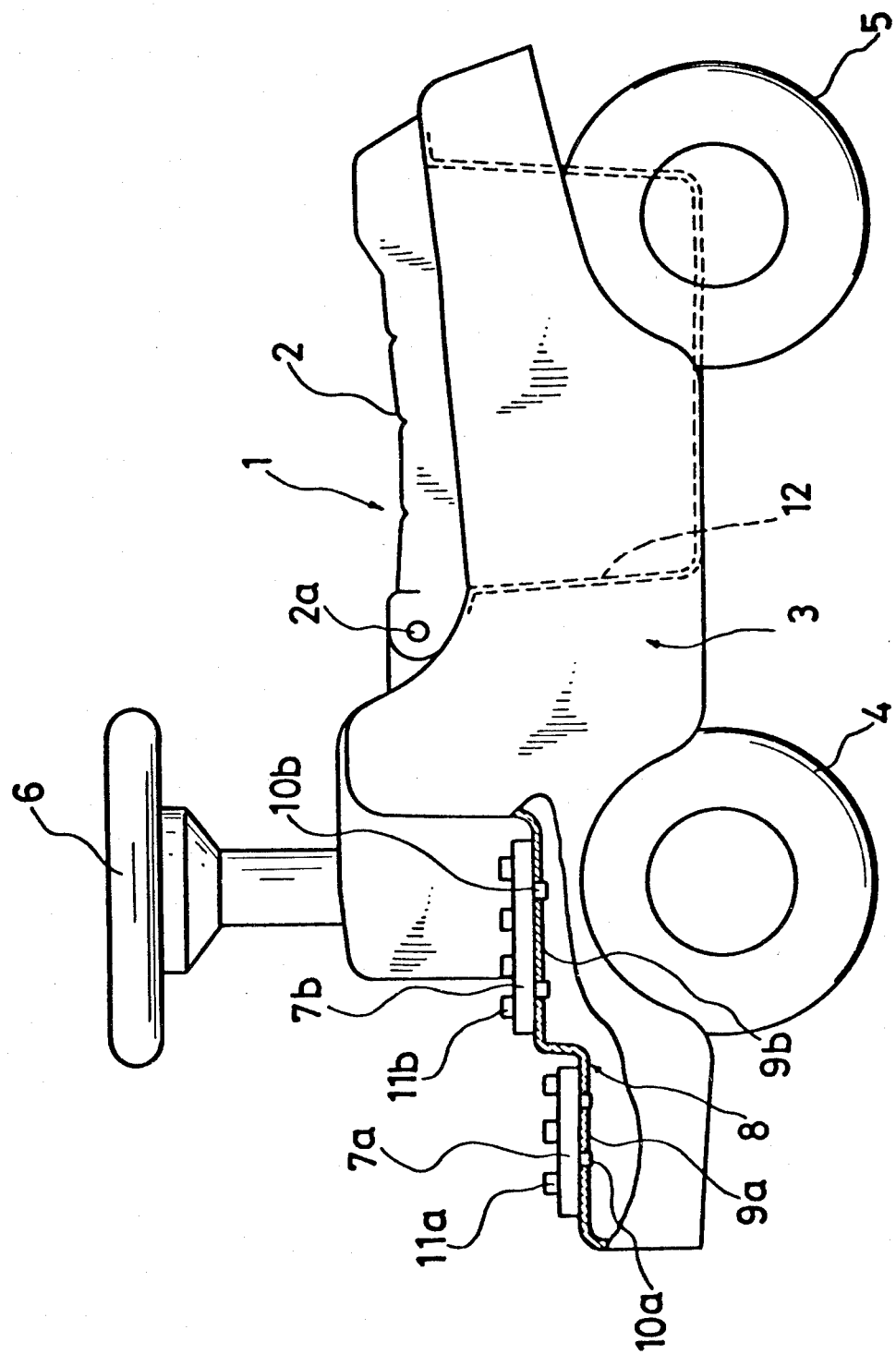
FIG. 2 is a side view thereof.

Referring to FIGS. 1 and 2, an above-described special type vehicle 1 for children has a seat 2 provided extending approximately from the center portion to the rear portion of the body 3. The seat 2 is hingedly rotatably attached to the body by a pin 2a. There is a container 12 below the seat 2. The container 12 contains unit blocks 13 for block building and other materials, and the contents of the container 12 can be put into and taken out from the container 12 by rotating the seat 2 about the pin 2a as its center. Respective pairs of front and rear wheels 4, 5 are provided at the both sides of the front and rear portions of the body 3 respectively. A handle 6 which steers the front wheels 4 is provided at the center of the front portion of the body 3. A base 7a is detachably provided on the front flat surface 9a of the front portion of the hood 8 of the body 3, pins 10a on the back surface of the base 7a being inserted into holes in the hood 8. Upwardly projecting bosses 11a for block building are arranged on the base 7a in a lattice pattern of three bosses 3 lengthwise and nine bosses sideways. Bases 7b are also detachably provided on the side flat surfaces 9b on both side portions of the hood 8 of the body 3, pins 10b on the back surface of the bases 7b being inserted into holes in hood 8. Bosses 11b for block building are arranged on the bases 7b in a lattice pattern of four bosses lengthwise and two bosses sideways.

Figure 3:
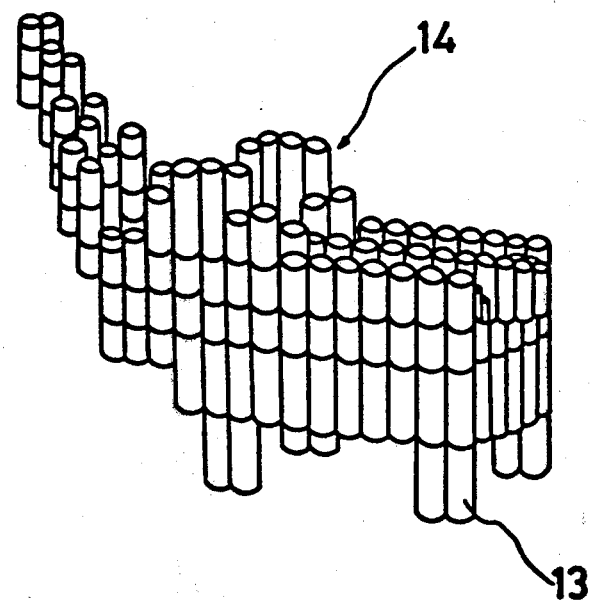
FIG. 3 is a perspective view of one embodiment of block building.

Using a vehicle for children such as described above, a child can play by sitting on the seat 2, grasping the handle 6, and going forward by kicking the ground. When he becomes tired of playing in this way, he can play block building. In order to play block building, he only has to take out unit blocks 13 from the container 12 after rotating the seat 2. Thereafter, he can enjoy constructing a model 14 of an animal and the like, as shown in FIG. 3, by inserting these unit blocks 13 onto the bosses 11a, 11b respectively located on base 7a, 7b and also by combining these unit blocks with each other. Therefore, he can enjoy playing in these two ways. As the bases 7a, 7b are detachably provided on the body 3 of the vehicle 1 in the embodiment described above, it is possible to remove the bases 7a, 7b from the vehicle 1 and to play block building apart from the vehicle itself. Therefore, a child can play in many ways using this vehicle.

Although the invention has been described in its preferred form, the scope of the present invention should not be restricted to the embodiment described above. For example, although the bases 7a, 7b are provided on 2 step portions of the hood 8 of the body 3 in the embodiment described above, it is of course possible to provide them on one flat surface. Furthermore, although the bases 7a, 7b are detachably provided on the hood 8 of the vehicle, it is possible to permanently attach the bases to the hood 8. However, it is possible to play block building only by removing the bases from the vehicle when such bases are detachably provided on the hood.

Although the bases are provided on the hood of the special type vehicle in the embodiment described above, it is also possible to provide bases on a hood or a meter panel board of a usual type automobile for children which a child can ride on and go forward by treading pedals which drive front or rear wheels. Furthermore, it is also possible to provide a base transversely on a center portion of a handle of a tricycle for children. In other words, it is possible to provide bases at suitable positions on any type vehicle for children.

What is claimed is:

1. A play vehicle for children comprising a vehicle body having front and rear ends, pair of front and rear wheels mounted at said front and rear ends respectively, a handle mounted on said vehicle body intermediate said front and rear ends, a seat mounted on said vehicle body to the rear of said handle, means to hingedly mount said seat to said vehicle body, a base mounted on said vehicle body to the front of said handle, said base comprising a plurality of upwardly projecting bosses arranged in a lattice pattern for receiving blocks for block building, said vehicle body, said handle and said seat all being so configured that a child can push said vehicle forward by straddling said seat and kicking the ground.

2. A vehicle for children according to claim 1 wherein said base is detachably mounted on said vehicle body.

3. A vehicle for children according to claim 1 or 2 wherein a container is provided under said seat and a plurality of relatively small uniform unit blocks, adapted for creative block building, are in said container.

* * * * *